United States Patent [19]

Ogawa et al.

[11] Patent Number: 4,584,766

[45] Date of Patent: Apr. 29, 1986

[54] APPARATUS FOR CONNECTION OF MULTICORE CABLE

[75] Inventors: Shingo Ogawa; Hitoshi Miyahira; Kensaku Sato, all of Tokyo; Yoshio Kawamura, Hitachi; Hirosi Kaida, Hitachi; Yoshizi Itoh, Hitachi, all of Japan

[73] Assignees: Hirose Electric Co., Ltd.; Hitachi, Limited, both of Tokyo, Japan

[21] Appl. No.: 542,256

[22] Filed: Oct. 14, 1983

[30] Foreign Application Priority Data

Oct. 14, 1982 [JP] Japan ................................ 57-180186
Oct. 14, 1982 [JP] Japan ........................... 57-155612[U]

[51] Int. Cl.$^4$ ............................................. B23P 19/00
[52] U.S. Cl. ........................................ 29/755; 29/407; 324/66
[58] Field of Search ................. 29/407, 857, 748, 753, 29/754, 755, 593; 324/66

[56] References Cited

U.S. PATENT DOCUMENTS

| | | | |
|---|---|---|---|
| 2,806,995 | 9/1957 | Meanley | 324/66 |
| 3,407,480 | 10/1968 | Hill et al. | 29/407 X |
| 3,705,347 | 12/1972 | Tuller | 29/755 X |
| 3,863,319 | 2/1975 | Pellet | 29/755 X |
| 3,913,202 | 10/1975 | Pyle et al. | 29/755 X |
| 4,030,029 | 6/1977 | Cox | 29/755 X |
| 4,107,838 | 8/1978 | Keen et al. | 29/753 X |

*Primary Examiner*—Howard N. Goldberg
*Assistant Examiner*—Carl J. Arbes
*Attorney, Agent, or Firm*—Fleit, Jacobson, Cohn & Price

[57] ABSTRACT

Firstly, each of the cores of a multicore cable are connected at one end thereof to the respective contacts of one of two connectors at random. Then, using a detector for detecting the change of electrical conditions of the cores, detection is made in a random fashion for the other ends of the cores to determine to which line contact of the one connector the one end of the corresponding core has been connected. The other end of the detected core is connected to a contact of a desired line of the other connector. In this manner, the both ends of the cores are connected to contacts of desired lines of the two connectors.

3 Claims, 19 Drawing Figures

FIG. 7
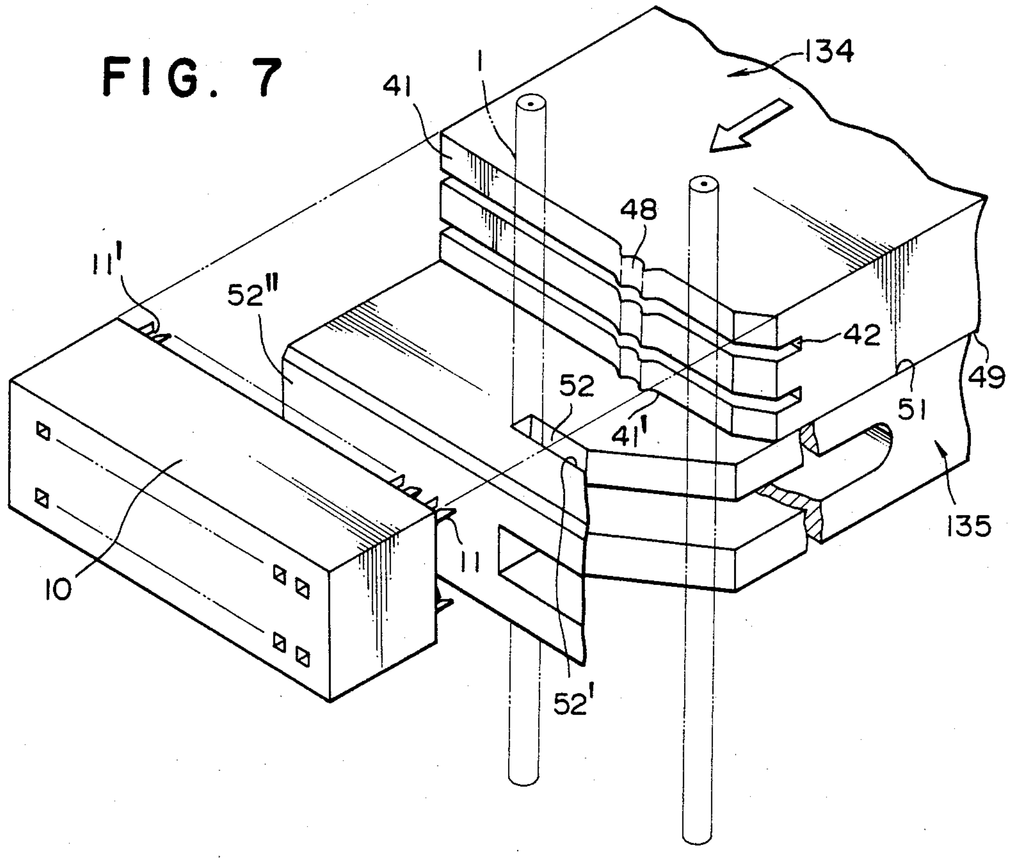
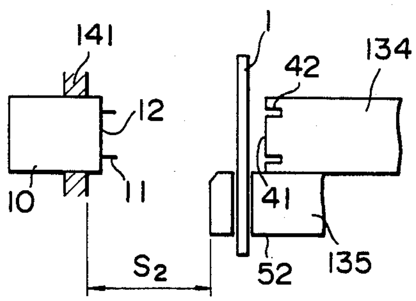
FIG. 8A
S1 FIG. 8B
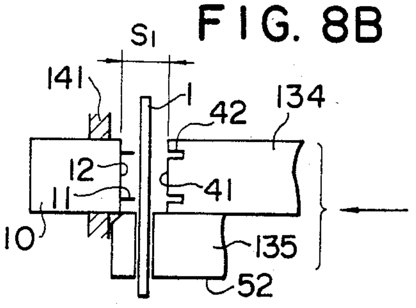
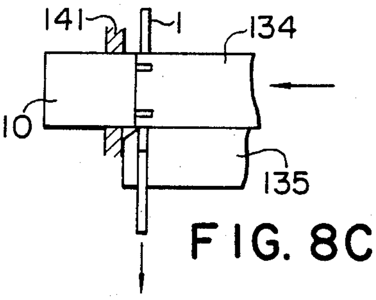
FIG. 8C

APPARATUS FOR CONNECTION OF MULTICORE CABLE

BACKGROUND OF THE INVENTION

1. Field of the Invention

The pesent invention relates to an apparatus for connection of a multicore cable.

2. Description of the Prior Art

So far, cores of a multicore cable are connected to the contacts of the connectors one by one, by discriminating the colors of insulation layers (sheaths) of cores that are colored depending upon the line number of cores, contact number of the connectors or array number of the contacts, determining the color markings of the cores for each of the contacts of the connectors and, when the cores are to be connected to the contacts, reading by eyes the line numbers of contacts that are indicated on the housing of the connector, discriminating the cores to be connected relying upon the color markings, or discriminating beforehand the clors of the cores, reading the line numbers of the contacts indicated on the connector, and connecting the cores one by one to the contacts.

However, such a conventional coupling method gives defects as described below.

(1) Color markings of the cores and line numbers of contacts must be read by the worker. Therefore, the greater the number of cores, the more the time is required for discriminating color markings and for reading the line numbers, causing the eyes of the worker to be tired.

(2) As the number of cores increases, colors become close to each other, which makes it difficult to distinguish the colors. The same also holds true for reading the line numbers of contacts on the connector side. Names, characters of line numbers become small with the increase in the number of poles. This results in the occurrence of erroneous connection and decreased operation efficiency.

(3) Cores are connected to the contacts chiefly by the hands of the worker. That is, the method is not suited for mass production.

Further, when it is desired to modify a portion of the circuit without changing the fundamental pattern of the electric circuit of an electric equipment, or when it is attempted to prepare a novel circuit utilizing the existing printed circuit board, a circuit of multicore calbe which is a peripheral circuit and which is connected through connectors, is often changed. In this case, cores of the multicore cable and contacts of the connector must be connected in a so-called cross-wiring manner. When the cross-wiring is to be carried out based upon the above-mentioned conventional connection method, complicated judgement is required for effecting cross-connection. For this purpose, extended periods of time are required to discriminate color markings and to read line numbers, and the eyes of the workers are subject to be worn out extremely.

The object of the present invention is to provide a method and an apparatus for correctly and quickly connecting the cores of a cable to desired contacts of the connectors, without relying upon the visual judgement of the worker, eliminating the defects inherent in the conventional coupling method.

Another object of the present invention is to provide an apparatus for cross-wiring a multicore cable, which is capable of cross-connecting the cores of a cable to contacts of the connectors correctly and quickly at all times, without relying upon the visual judgement of the worker, eliminating problems inherent in the conventional art of cross-wiring.

SUMMARY OF THE INVENTION

According to one aspect of the present invention, there is provided an apparatus for connecting both ends of cores of a multicore cable to contacts of desired line numbers of two connectors A and B which operates in the following manner: connecting each of the cores of the multicore cable at one end (A) thereof to the respective contacts of one (connector A) of the two connectors at random, randomly selecting one of the other ends (B) from the cores in the multi-core cable, determining which line contact in connector A is connected to the core corresponding to the selected end B, by use of a detector for detecting the change of electrical conditions of in the corresponding core from all the cores on the cable, and connecting the end B of the dectected corresponding core to a desired line contact of the other connector B.

According to another aspect of the present invention, there is provided an apparatus for press-connecting both the first and second ends of cores of a multicore cable to contacts of corresponding line numbers of respective first and second connectors, comprising:

an operation plate;

a press-connecting drive device provided on said operation plate for press-connecting the first and second end of cores of the multicore cable to contacts of the respective first and second connectors;

a connector holding/moving device provided on said operation plate for holding one of the first or second connectors and moving the the held connector relative to a press-connecting position;

a detector for detecting the change of electrical conditions of a selected one of the cores;

a coupling connector for connecting said detector to the first connector which is connected to the cores at the first end of said multicore cable; and a control circuit for controlling said connector holding/moving device and said press-connecting drive device, including means for actuating said press-connecting drive device after every single pitch movement of the first connector by said connector holding/moving device, and means for performing a single-pitch feed press-connecting operation for successively press-connecting the first ends of the cores to the contacts of said one connector in a random fashion, and seocnd means for actuating said press-connecting drive device after every movement of said second connector to select a corresponding line number on said second connector responsive to signals sent from said detector and indicating the line number of said first connector to which said selected core is connected, and second means for performing a line-selection feed press-connecting operation for successively press-connecting the second ends of each successively selected core to the line number of said second connector corresponding to said line number of said first connector of said selected core.

According to a further aspect of the present invention, there is provided an apparatus for cross-wiring both the first and second ends of cores of a multicore cable to contacts of line numbers of respective first and second connectors, comprising:

an operation plate;

a connecting drive device provided on said operation plate for connecting the first and second end of cores of the multicore cable to contacts of the respective first and second connectors;

a connector holding/moving device provided on said operation plate for holding one of the first or second connectos and moving the held connector relative to a connecting position;

a detector for detecting the change of electrical conditions of a selected one of the cores;

a coupling connector for connecting said detector to the first connector to which is connected to the cores at the first end of said multicore cable;

a cross-wiring box disposed between said coupling connector and said detector for enabling any desired cross-wiring between the line number contacts in said first connector and the desired line number contact in said cross-wiring box; and a control circuit for controlling said connector holding/moving device and said connecting drive device, such that said press-connecting drive device is actuated after every movement of said second connector to select a corresponding line number responsive to signals sent from said detector indicative of the line number contact of said first connector as altered by said cross-wiring box and said second connector being held by said connector holding/moving device and being moved thereby to perform a line-selection feed connecting operation for successively connecting the second ends of the cores to the desired line number contacts of said second connector.

Embodiments of the present invention will be described below in detail in conjunction with the accompanying drawings.

BRIEF DESCRIPTION OF THE DRAWINGS

FIG. 7 is a perspective view illustrating, on an enlarged scale, a relation between the connector and the press-connecting rod in the pressing portion of the press-connecting apparatus of FIG. 3;

FIGS. 8(A), 8(B) and 8(C) are diagrams which schematically illustrate the order for press-connecting ends of cores of the cable to the connector;

DESCRIPTION OF THE PREFERRED EMBODIMENTS

Figure 1:
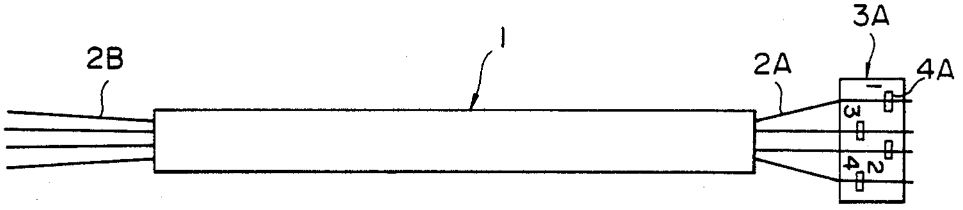
FIGS. 1 and 2 are diagrams which schematically illustrate the principle of connecting both ends of cores of a multicore cable to corresponding contacts of the terminal connectors according to the present invention.
Figure 2:
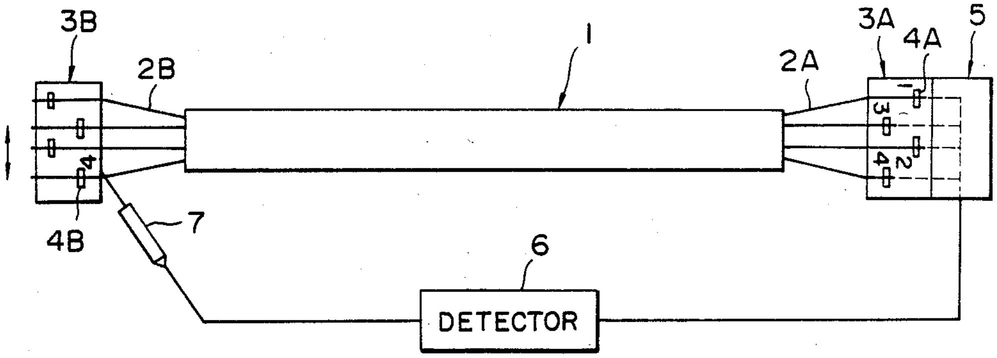

FIGS. 1 and 2 are diagrams which schematically illustrate the principle of connecting both ends of cores of a multicore cable to corresponding contacts of the terminal connectors according to the present invention. The principle of connecting of this invention will be described below with reference to these drawings. First, as shown in FIG. 1, sheath is peeled off at both ends of a multicore cable 1, so that core ends 2A, 2B are exposed. The core ends 2A which are exposed on one side are coupled to contacts 4A of a connector 3A in a random fashion. Then, an end of a detector 6 which will be described later, is connected via a coupling connector 5 to the connector 3A to which the core ends 2A are coupled. Other end of the detector 6 is connected to a touch sensor 7. The other core ends 2B of the cable are then touched by the touch sensor 7 of the detector 6. Under this condition, the contacts 4A to which the core ends 2A of the cable are connected are scanned by the scanner of the detector 6 via coupling connector 5. The core of which the end 2B is touched by the touch sensor 7 exhibits a capacity or an impedance which is different from the cores that are not touched. It is thus possible to detect the line number of the contact to which the end 2A of the touched core is connected, and this line number is displayed on a display consisting of LED of the detector 6. The worker therefore should connect the end 2B of the core touched by the touch sensor 7 to a contact 4B of the connector 3B which corresponds to the displayed line number, either manually or automatically. If the above-mentioned operation is effected for all of the core ends 2B, these core ends 2B of the cable of which the core ends 2A are connected to the contacts 4A of the connector 3A can be connected to the contacts 4B of corresponding line numbers of the connector 3B without inviting error.

Figure 3:
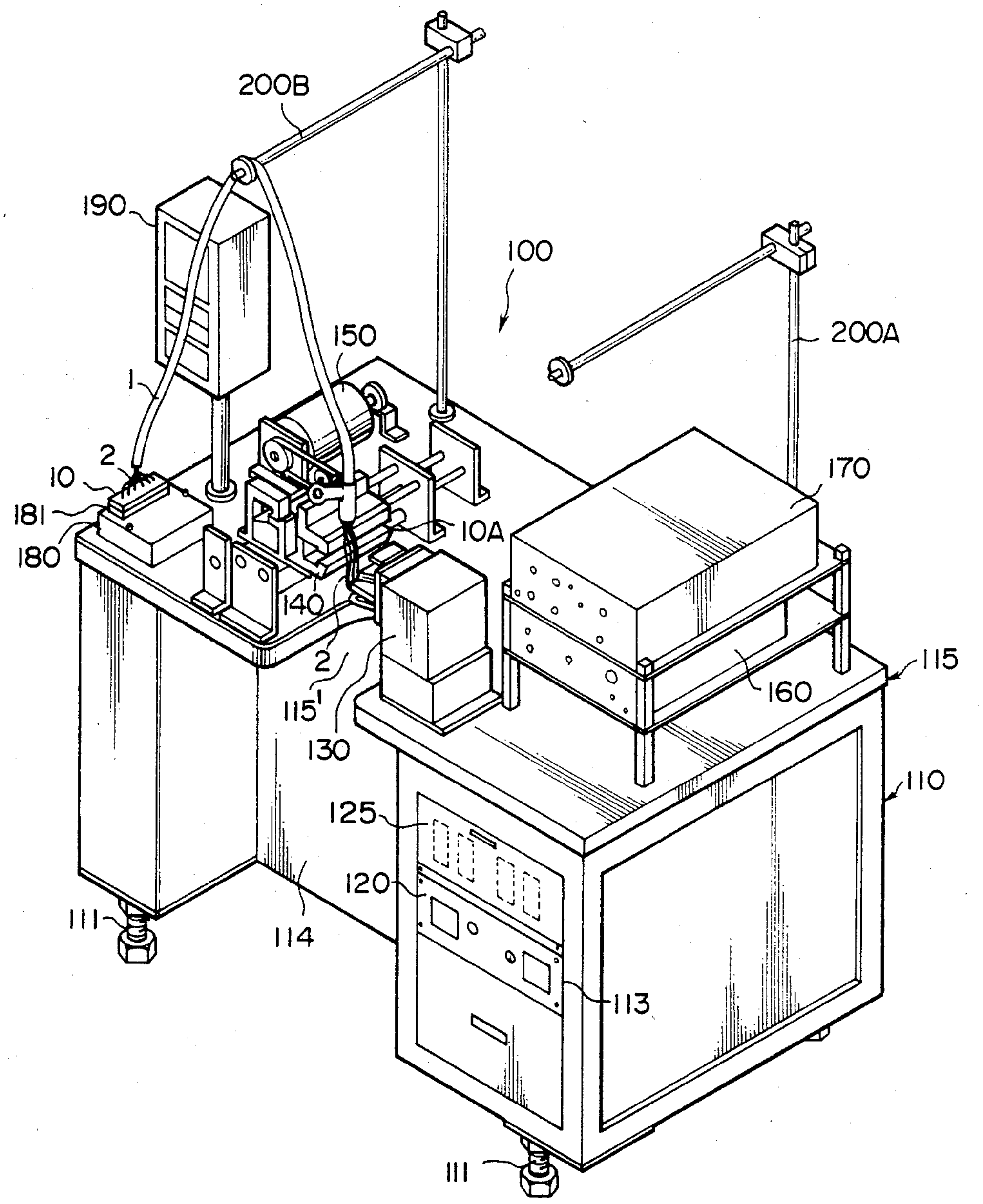
FIG. 3 is a perspective view which schematically illustrates a press-connecting apparatus according to an embodiment of the present invention.
Figure 4B:
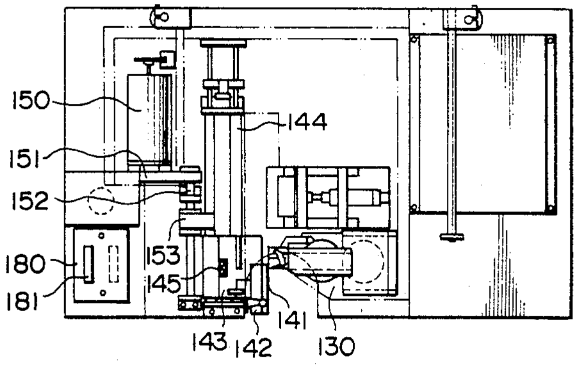
FIGS. 4(A), 4(B) and 4(C) are a front view, a plan view and a side view of the press-connecting apparatus of FIG. 3.
Figure 4A:
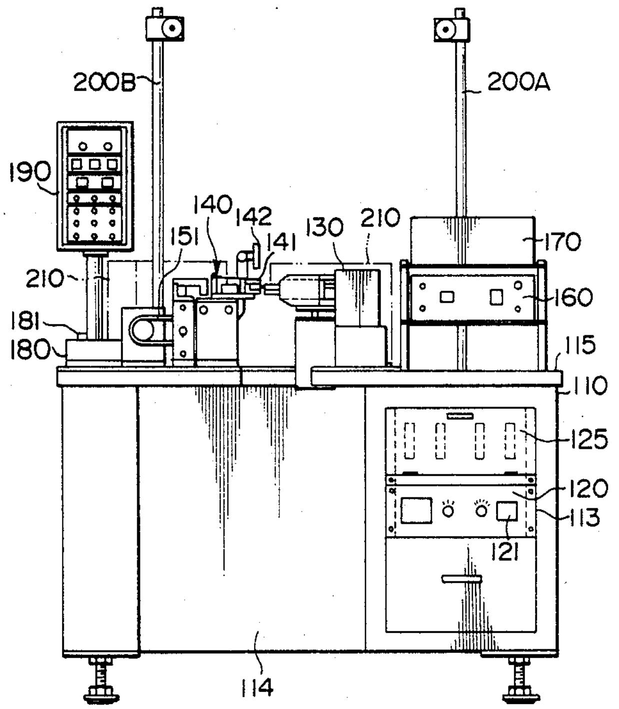
Figure 4C:
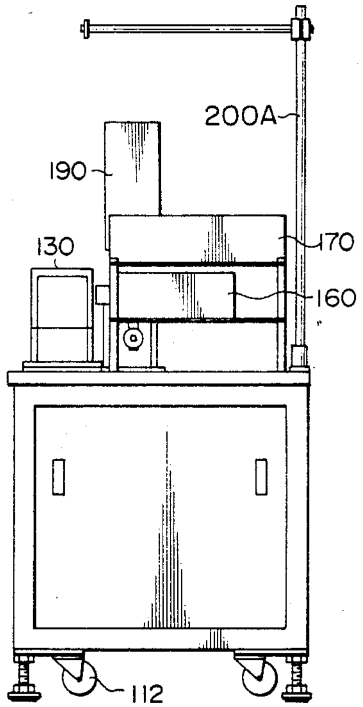

FIG. 3 is a perspective view which schematically illustrates a press-connecting apparatus according to an embodiment of the present invention, and FIGS. 4(A), 4(B) and 4(C) are a front view, a plan view and a side view of the press-connecting apparatus of FIG. 3. An apparatus 100 for press-connecting the connectors consists of an operation plate 110, a control box 120, a press-connecting drive device 130, a connector holding-/moving device 140, a pulse motor 150, a detector 160, a cable tester 170, a detector connection box 180, an operation box 190, and cable-holding arms 200A, 200B.

The operation plate 110 has a plurality of legs 111 and casters 112 under the lower surface thereof. By turning screws, the legs 111 work to adjust the height and horizontal position of the operation plate 110. Further, by reducing the length of the legs 111 or by removing the legs 111, the operation plate 110 can be freely moved on the casters 112. In the right of the operation plate 110 is provided an accommodation 113 for accommodating the control box 120, and in the central portion of the operation plate 110 is formed a recessed portion 114 to facilitate the operation by the worker. On the upper surface of the operation plate 110 is provided an installation board 115 on which are installed various devices, and in the front central portion of the installation board 115 is formed an inverse U-shaped groove 115′ to facilitate the press-connecting operation.

The control box 120 is equipped with a power source and a power source switch 121.

Figure 5:
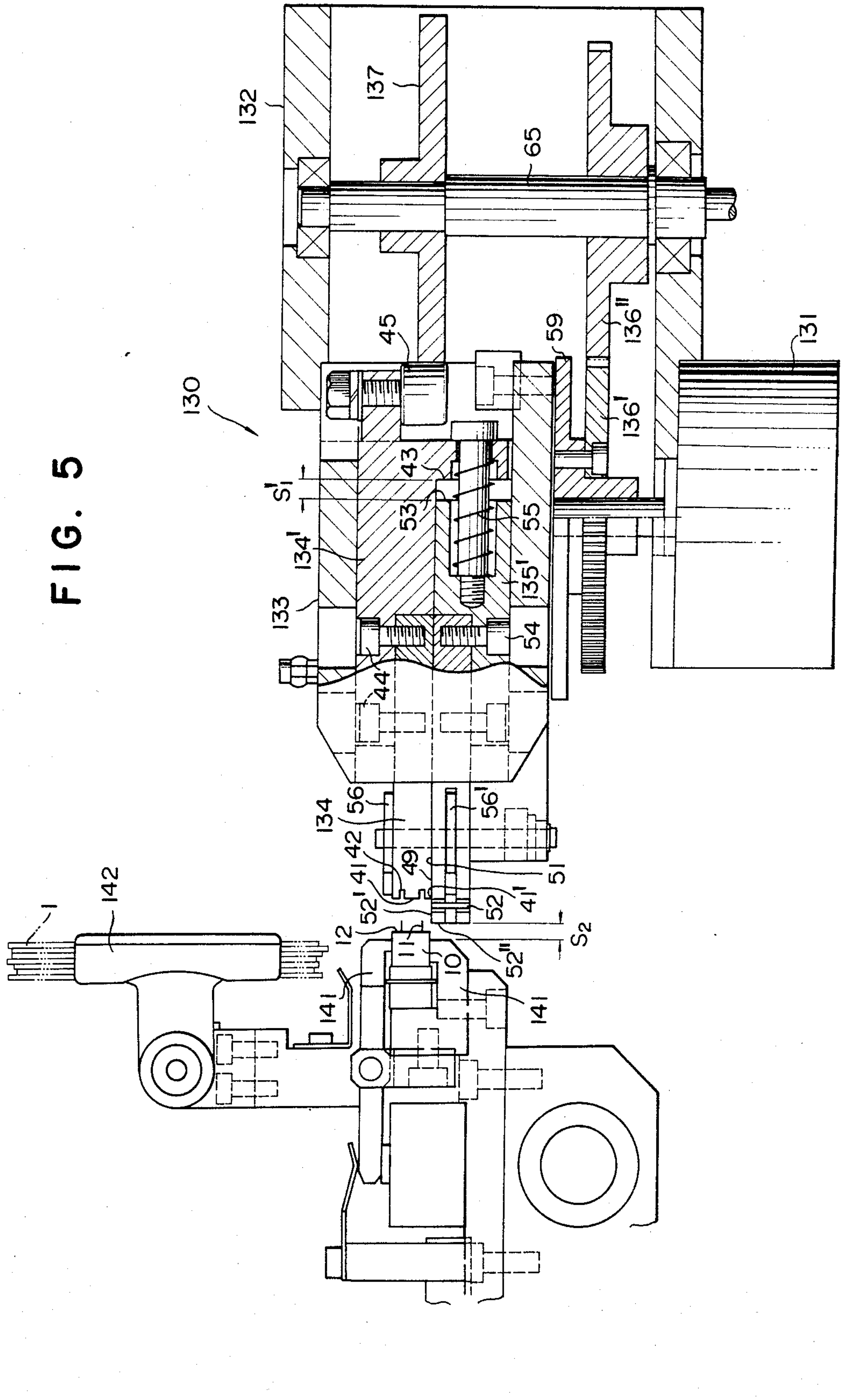
FIGS. 5 and 6 are a front view and a plan view illustrating, in a partly cut-away manner and on an enlarged scale, a pressing portion of the press-connecting apparatus of FIG. 3.
Figure 6:
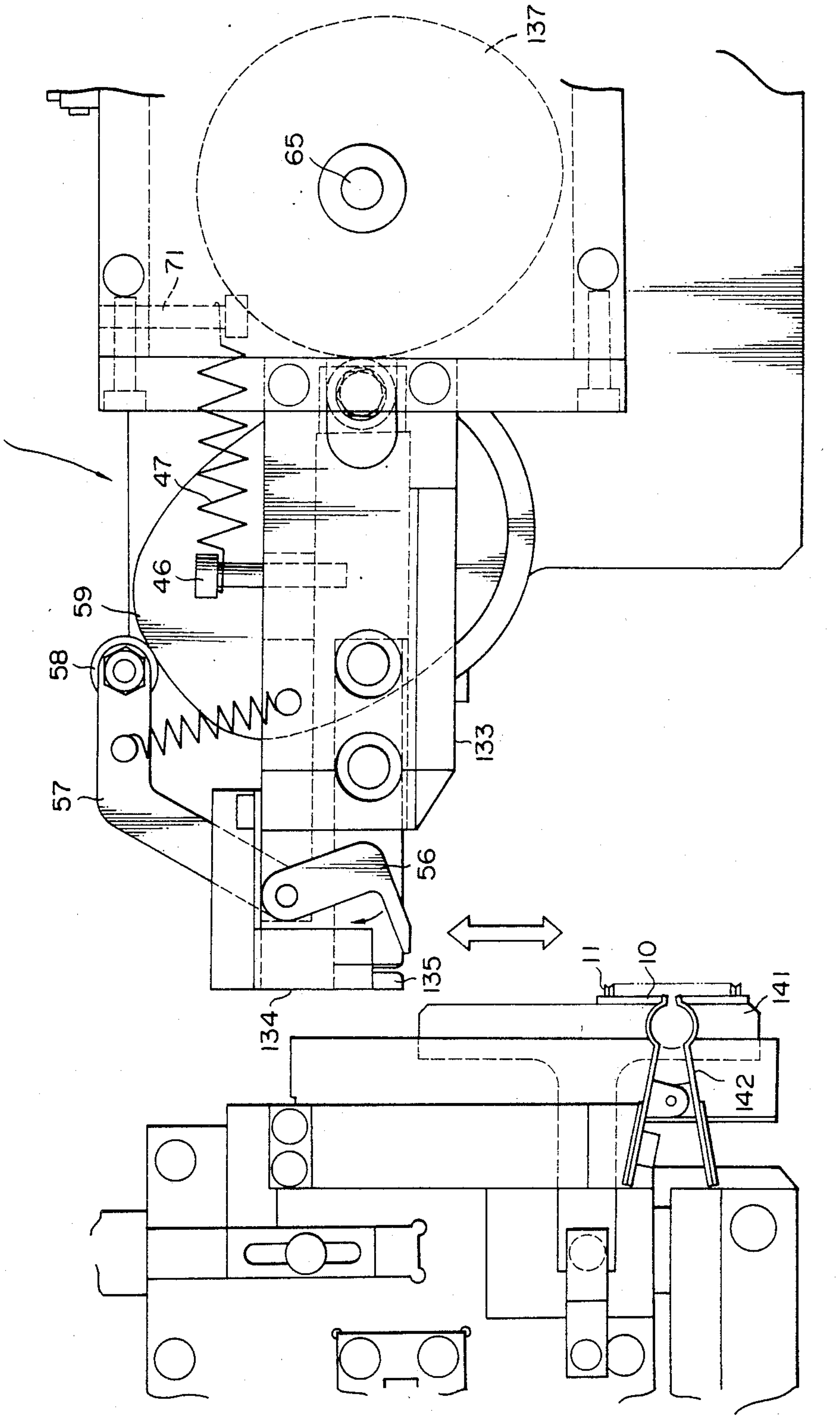

FIGS. 5 and 6 are a front view and a plan view illustrating a pressing portion in a partly cut-away manner and on an enlarged scale, FIG. 7 is a perspective view illustrating, on an enlarged scale, a relation between the connector and the press-connecting rod in the pressing portion, and FIGS. 8(A), 8(B) and 8(C) are diagrams which schematically illustrates the order for press-connecting core ends of the cable to the connector.

Construction and operation of the press-connecting drive device 130 and connector holding/moving device 140 will be described below in detail with particular reference to FIGS. 5 to 8. The press-connecting drive device 130 consists chiefly of a drive motor 131, a drive box 132, a press-connecting rod cover 133, a press-connecting rod 134, and a guide bar 135. In the drive box 132 are contained gears 136', 136", and a cam 137 to transmit the driving power of the drive motor 131. The connector holding/moving device 140 is equipped with a holder 141 for holding a connector 10, and a cable clip 142 for holding the cable. The holder 141 is mounted on a moving plate 143.

The holder 141 holds the connector 10 in such a manner that a press-connecting contact 11 thereof is protruded toward a front side surface 41 of the press-connecting rod 134 that will be described later. A group of cables 1 are held by the cable clip 142 above the holder 141.

The press-connecting rod 134 is located at the back of the connecting surface 12 of the connector 10 having press-connecting contacts 11, that is supported by the holder 141. The press-connecting rod 134 has a front surface 41 opposed to the connecting surface 12 of the connector 10. A rear half portion of the press-connecting rod 134 and a pressing piece 134' are accommodated in the press-connecting rod cover 133 in such a manner that the front end 41 advances to come into contact with the connecting surface 12 or advances to a position just before it contacts to the connecting surface 12, and then retreats. Grooves 42 are formed in the front surface 41 of the press-connecting rod 134 so that the press-connecting contacts 11 are allowed to escape when the front surface 41 is brought into contact with, or brought close to, the connecting surface 12 of the connector. The press-connecting rod 134 has at the rear portion thereof a pressing piece 134' that is fastened thereto as a unitary structure by bolts 44. The pressing piece 134' has a cam follower 45, and transmits the driving force from the drive unit to advance the press-connecting rod 134. A pulling spring 47 is hooked between a bolt 46 attached to the pressing piece 134' and a bolt 71 attached to a stationary portion, so that the pressing piece 134' is pulled backwards at all times.

Further, the press-connecting rod 134 has a cable-holding groove 48 (see FIG. 7) which is formed in the front surface 41, so that the cable 1 will not be deviated from the proper direction of press-connecting.

The guide bar 135 has a slide-contact surface 51 that comes into sliding contact with a slide-contact surface 49 of the press-connecting rod 134, has a front portion 52' in the front portion thereof, and has an engaging piece 135' in the rear portion thereof, the engaging piece 135' being coupled thereto as a unitary structure by a bolt 54 or the like. The rear half portion of the guide bar 135 and the engaging piece 135' coupled thereto, are so disposed as to advance and retreat in the press-connecting rod cover 133, like the press-connecting rod 134 and the pressing piece 134'. The engaging piece 135' has a stop surface 53 at the rear end, and is opposed to a stepped portion 43 of the pressing piece 134' being separated away therefrom by a distance equal to a predetermined distance $S_1$ for cutting the cable and for completely press-connecting the cable, that will be mentioned later, or being separated away therefrom by a distance $S_1'$ longer than the predetermined distance $S_1$. A compression spring 55 is disposed between the engaging piece 135' and the pressing piece 134' to urge them back and forth.

The guide bar 135 advances via the cam follower 45 being actuated by a cam mechanism that will be mentioned later, and further advances in cooperation with the press-connecting rod 134 being pushed by the compression spring 55. The guide bar 135 ceases to advance as the end surface 52" of the guide bar 135 comes into contact with the holder 141. However, the press-connecting rod 134 further advances overcoming the force of the compression spring 55 since there exists a gap distance $S_1'$ between the stop surface 53 of engaging piece 135' and the stepped portion 43 of pressing piece 134'. When the cam 137 rotates to a point of its maximum length, the cam follower 45 advances most, whereby the gap distance $S_1'$ becomes minimal. The front surface 41 cuts the cable 1, and the press-connecting rod 134 advances most so that the cable is press-connected to the press-connecting contact 11.

The slide surface 51 of guide bar 135 slides and cooperates with the slide surface 49 on the lower side of the press-connecting rod 134, and the front surface of press-connecting rod 134 forms a blade surface 41' which cuts by shearing force the cable 1 that is held in the guide groove 52 of the guide bar 135. A blade surface 52' is further formed by the guide groove 52 of the guide bar 135.

In order for the cable 1 to be sufficiently inserted and held in the guide groove 52, a push lever 56 is provided at an upper portion of the guide groove 52, and a push lever 56' is provided at a middle portion of the guide groove 52 on the opening side thereof. The push levers 56 and 56' are actuated by the cam 59, cam follower 58 and lever 57. The mechanism is so designed that the cable 1 is sufficiently pushed into the guide groove 52 before the front surface 41 of press-connecting rod 134 advances into the guide groove 52.

The press-connecting rod 134 is coupled to a drive portion which advances and retreats the press-connecting rod 134. The front surface 41 of press-connecting rod 134 advances starting from a position at the back of the guide groove 52 of guide bar 135, passes through the guide groove 52 to cut the cable 1. The front surface 41 further advances until the cable 1 which is cut is press-connected to the press-connecting contact 11 of the connector 10. The front surface 41 then retreats in the reverse direction being pulled by the pulling spring 47, and returns to the starting position. This operation is repeated for each of the press-connecting contacts 11 of the connector 10.

In the drive portion, a drive motor 131 is provided as a driving source. Rotational force of the motor is transmitted to a shaft 65 via gears 136', 136". A cam 137 is fastened to the shaft 65, and rotational force of the motor 131 is transmitted thereto.

The motor 131 also rotates the cam 59 that actuates the push levers 56, 56' which are provided on the opening side of the guide groove 52.

Further, as best shown in FIG. 6, the press-connecting rod 134 and guide bar 135 are allowed to move in the direction of plane of the connector 10. The cable-holding mechanism 48 in the front portion 41 of the press-connecting rod 134 and the guide groove 52 formed in the guide bar 135 are allowed to be selectively moved so as to be corresponded to each of the press-connecting contacts 11 of the connector 10. Though not diagramed, they are moved either manually or by a driving force.

Described below is the procedure for press-connecting the cable to the connector using the thus constructed press-connecting portion.

(1) First, the press-connecting connector 10 is secured to the holder 141.

(2) Then, a cable 1 to be press-connected is taken out from the cable clip 142, and is inserted in the guide groove 52 of the guide bar 135. In this case, the press-connecting rod 134 is manually or automatically moved relative to the press-connecting contact 11, and is secured at a position corresponding to the cable-holding groove 48 which is formed in the front surface 41.

(3) The motor 131 is rotated either by an automatic switch (not shown) such as photosensor or by a manual switch, the cam 59 is rotated to drive the lever 57 and the puch levers 56, 56', and the cable 1 is held. The driving force of the motor 131 is transmitted to the cam 137 via gears 136', 136'', and the cam follower 45 engaged with the cam 137 is gradually pushed forward against the force of pulling spring 47.

(4) The pressing piece 134' constructed as a unitary structure together with the cam follower 45 which is pushed forward, and the press-connecting rod 134, are also moved forward. The engaging piece 135' and the guide bar 135 which are pushed forward by the compression spring 55, also move forward in cooperation therewith.

(5) The front surface 52'' of guide bar 135 which has advanced up to a predetermined distance $S_2$, then comes into contact with the holder 141, and ceases to advance (refer to FIG. 8(B)). In this case, however, the pressing piece 134' and the press-connecting rod 134 which had been advancing in cooperation therewith, further advance owing to the advance of cam follower 45 overcoming the force of compression spring 55.

(6) Then, the front surface 41 of press-connecting rod 134 comes into contact with the cable 1 that is held in the guide groove 52, to hold the cable 1 by the cable-holding groove 48. The front surface 41 further advances, whereby the cable 1 is cut by shearing force by blade surfaces 41', 52' formed in the front surface 41 of press-connecting rod 134 and in the guide groove 52 of guide bar 135. The lower extra length of the cable which is cut falls due to its own weight.

(7) After the cable has been cut, the front surface 41 of press-connecting rod 134 advances up to a predetermined distance which is separated away from the starting point by $S_1$. Namely, with the cut cable 1 being held in the cable-holding groove 48, the front surface 41 guides the cable 1 to the press-connecting contact 11 of the connector with the application of pressure, so that the cable is completely press-connected thereto. At this moment, the cam 137 has been rotated to a point of its maximum length, and the cam follower 45, pressing piece 134' and press-connecting rod 134 that engage therewith, are advanced to their maximum degrees, so that a gap distance $S_1'$ becomes minimal between the stepped portion 43 and the stop surface 53.

(8) As the cable is completely press-connected, the cam 137 further rotates and returns to a point of minimum length, whereby the cam follower 45, pressing piece 134' and press-connecting rod 134 return to the starting position being pulled by the pulling spring 47. The engaging piece 135' and the guide bar 135 which had been cooperated with the press-connecting rod 134, are also pulled back to retreat to the starting positions. Thus, all members return to the starting points to make it ready for the next press-connecting operation. When the above-mentioned press-connecting operation is finished, the connector holding/moving device 140 moves the connector 10 by a suitable number of contact array pitches. Thereafter, the above-mentioned press-connecting operation is repeated to press-connect the cable cores to all contacts of the multipole connector.

Reverting to FIGS. 3 and 4, rotational force of the pulse motor 150 is transmitted to a moving chuck 153 via belt 151 and rotary shaft 152. As the pulse motor 150 is actuated with the moving chuck 153 being inserted and chucked in a chuck receiver 145 of a moving plate 143, the moving plate 143 or the holder 141 is fed pitch by pitch along a spindle 144.

The press-connecting apparatus of this embodiment is provided with a cross-wiring box 125 which exhibits the function that will be mentioned later. The description, however, first deals with the case when the cross-wiring box 125 is not used.

A detector connection box 180 is provided with a connector 181 which is connected to the detector 160.

Figure 9:
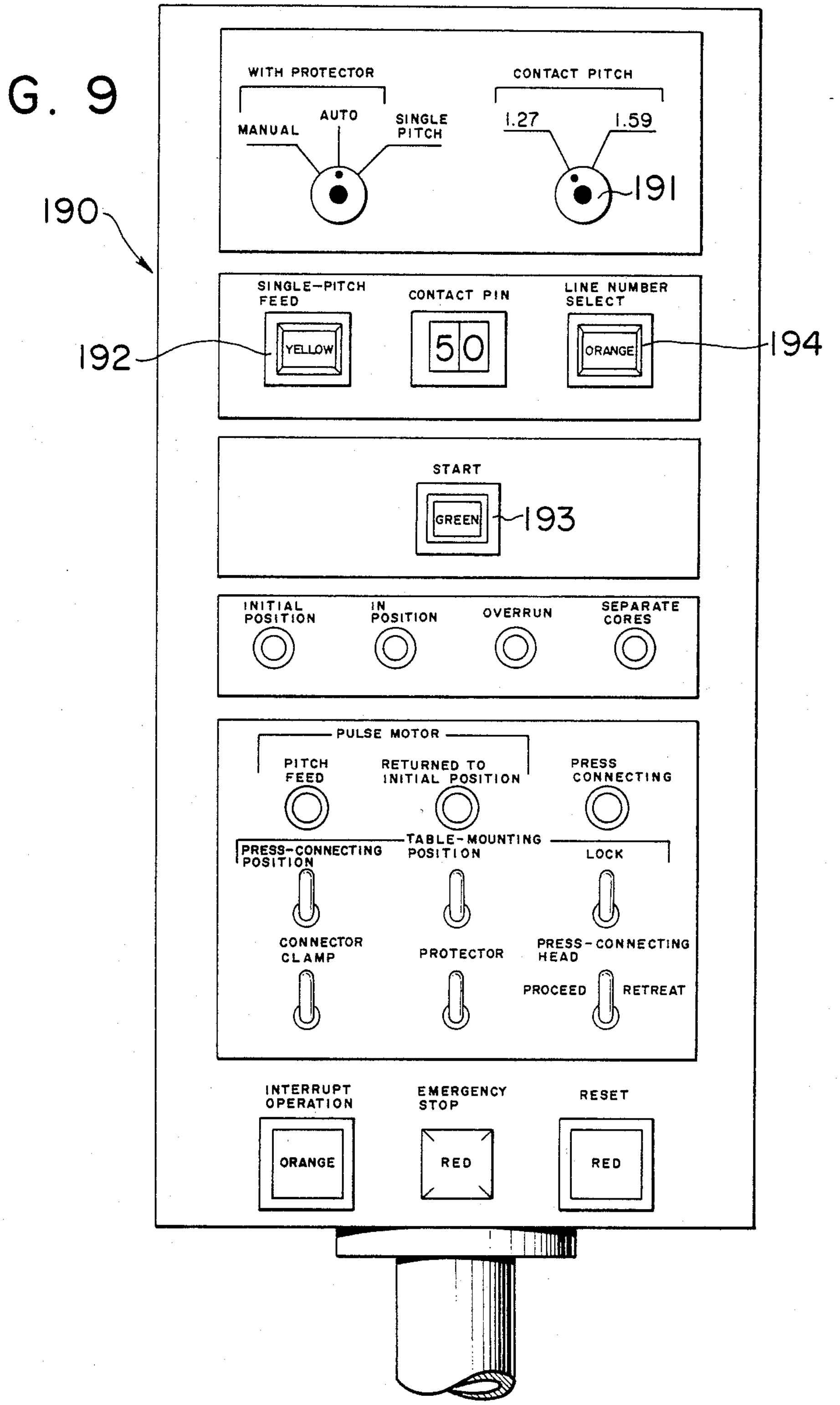
FIG. 9 is a front view illustrating, on an enlarged scale, an operation box in the press-connecting apparatus of FIG. 3.

An operation box 190 is provided with a variety of switches and dials for manipulating the entire operation of the press-connecting apparatus. FIG. 9 illustrates the arrangement thereof.

Figures 10, 10A:
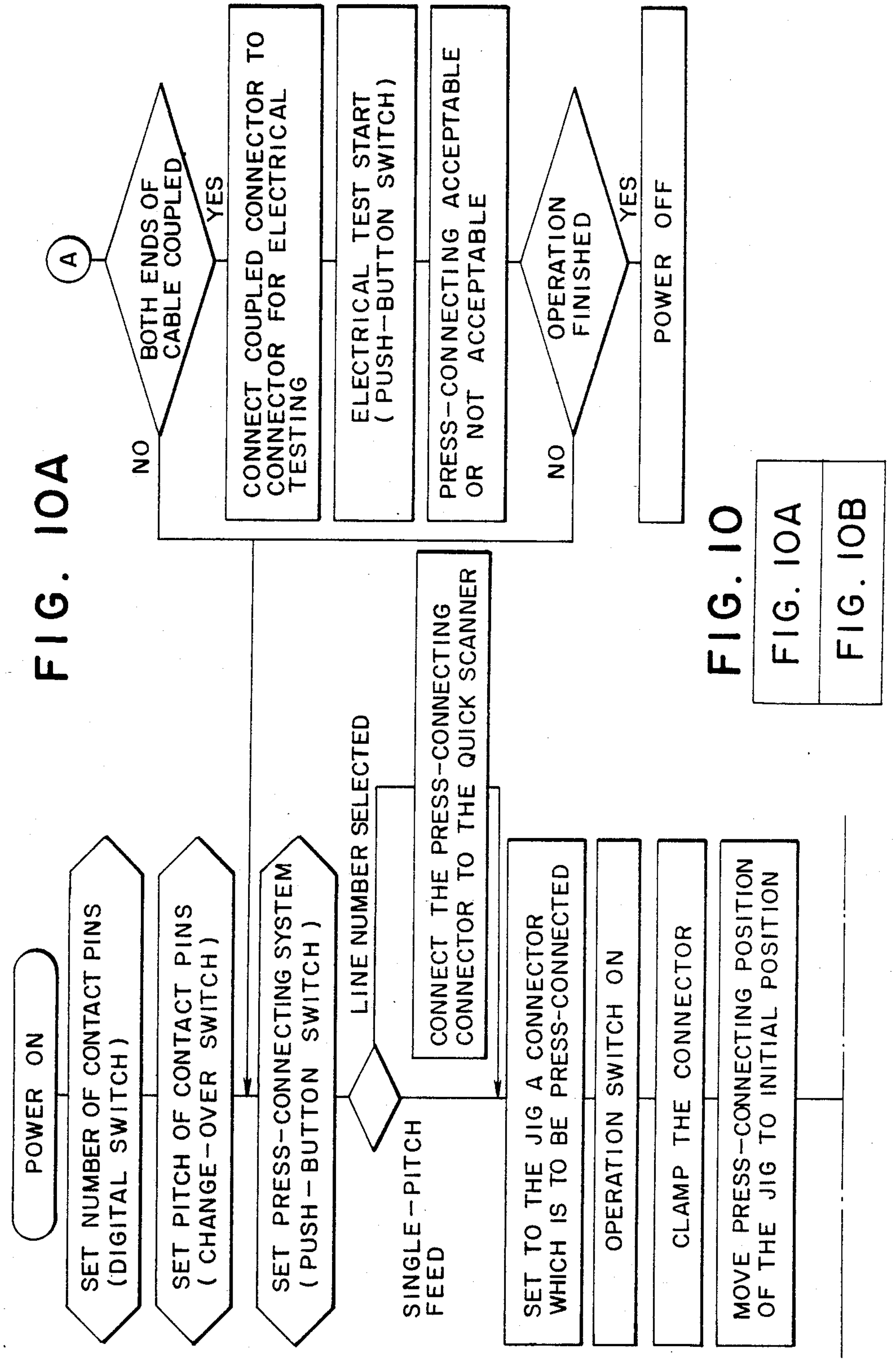
FIG. 10 is a flow chart illustrating the whole operation of the press-connecting apparatus of FIG. 3.
Figure 10B:
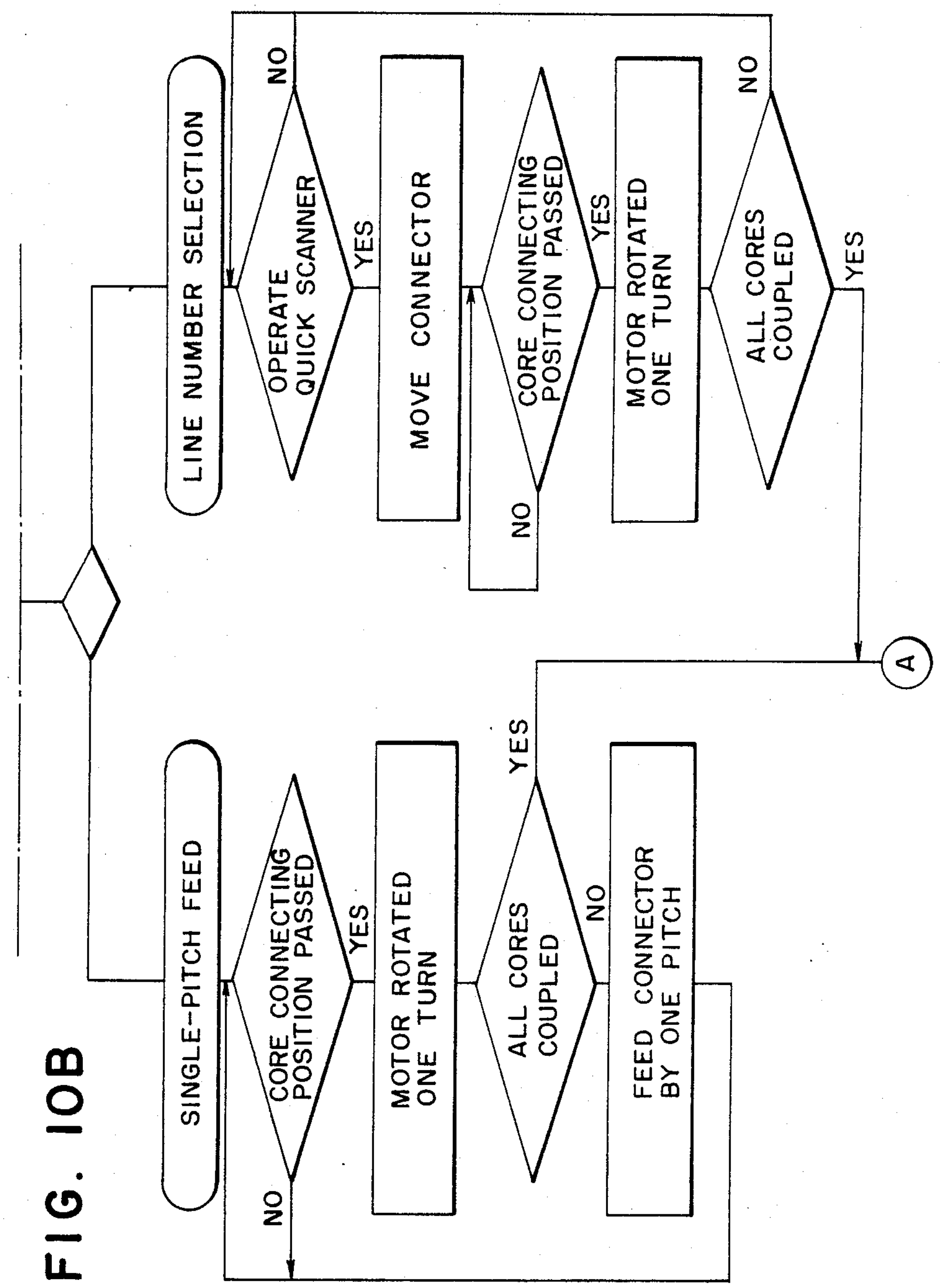

FIG. 10 is a flow chart which illustrates the entire operation of the press-connecting apparatus of the invention.

Described below is the procedure when the connectors are to be connected to both ends of the cable using the press-connecting apparatus.

(1) Sheath of the cable 1 is peeled off at both ends, so that the cores 2 are separately exposed.

(2) The cable 1 from the sheath is removed is held by a cable-holding arm 200B, and one end of the cable to be press-connected is secured by the cable clip 142.

(3) The power source is turned on by the power source switch 121 provided in the control box 120 of the apparatus.

(4) A contact pitch, i.e., either a pitch 1.27 mm or a pitch 1.59 mm is set by a switch 191 provided in the operation box 190. Then, a single-pitch feed switch 192 is depressed to perform the press-connecting feed by a single pitch (to successively feed by a pitch same as the pitch of contacts).

(5) The connector 10 is to be press-connected is inserted in the holder 141, and a start button 193 of the operation box 190 is depressed. The connector 10 is firmly held by the holder 141. The moving plate 143 holding the holder 141 is moved along the spindle 144 by an air cylinder (not shown) and is stopped at a position where the press-connecting of the first time will be effected. In this case, as mentioned earlier, the moving chuck 153 is inserted and chucked in the chuck receiver 145 of moving plate 143 which is moved pitch by pitch by the pulse motor 150.

(6) A given core 2 of the cable 1 is gripped and is inserted into the core guide groove 52 of the guide bar 135. The drive motor 131 is rotated by closing a foot switch or a photoswitch, whereby the gears 136', 136" and cam 137 operate as mentioned earlier, the press-connecting rod 134 moves leftwards, an extra length of the core 2 guided into the core guide groove 52 is cut off so that the core will have a length just required for press-connecting, and the core 2 is press-connected to the contact 11 of the connector 10 by the movement of press-connecting rod 134. When the connecting is finished, the press-connecting rod 134 moves to the initial position. This operation is performed by one complete turn of the cam 137. As the cam 137 turns once, the switch of the pulse motor 150 is automatically closed, and the moving plate 143 moves by one pitch only to make it ready for performing the next core-connecting operation.

(7) Next, another core 2 is gripped, inserted into the core guide groove 52 of the guide bar 135, and the foot switch or photoswitch is closed in the same manner as mentioned in (6) above. The core 2 is then press-connected by the press-connecting rod 134. Thus, the cores are press-connected to all of the contacts successively.

(8) The connector 10 with its contacts being all press-connected, is then coupled to a connector 181 of the detector connection box 180. The cable 1 is held by the cable-holding arm 200B in such a manner that unconnected ends can be press-connected.

(9) A line number selection switch 194 of the operation box 190 is despressed to set the pulse motor 150 so that the pulse motor 150 operates according to the line number selection and the line number.

(10) A connector 10A which is the same as the connector 10 and to which the other end of the cable 1 will be press-connected, is inserted in the holder 141, and the start button 193 of the operation box 190 is depressed. The connector 10A is firmly held by the holder 141.

(11) A given core 2 of the cable 1 is gripped (conductor of the core must be gripped), and is inserted in the core guide groove 52 of the guide bar 135. The foot switch or photoswitch is closed to select the line number by the detector 160 which is connected to the connector 10. A line number signal of the detector 160 is supplied via a comparator to the pulse motor 150 to actuate it, whereby the moving plate 143 moves and the connector 10A is set to the position of a contact corresponding to the line number. Line number selection by the detector 160 and operation of the pulse motor by line number signals, will be described later in detail. Then, the drive motor 131 runs, and the core 2 is press-connected to the contact in the same manner as described above. The above-mentioned operation is carried out for all of the contacts.

Described below is the operation for controlling the press-connecting of cores in the case of single-pitch feeding mentioned earlier and in the case of feeding by selecting the line number, in conjunction with FIG. 11 which is a block diagram of the control circuit.

Figure 11:
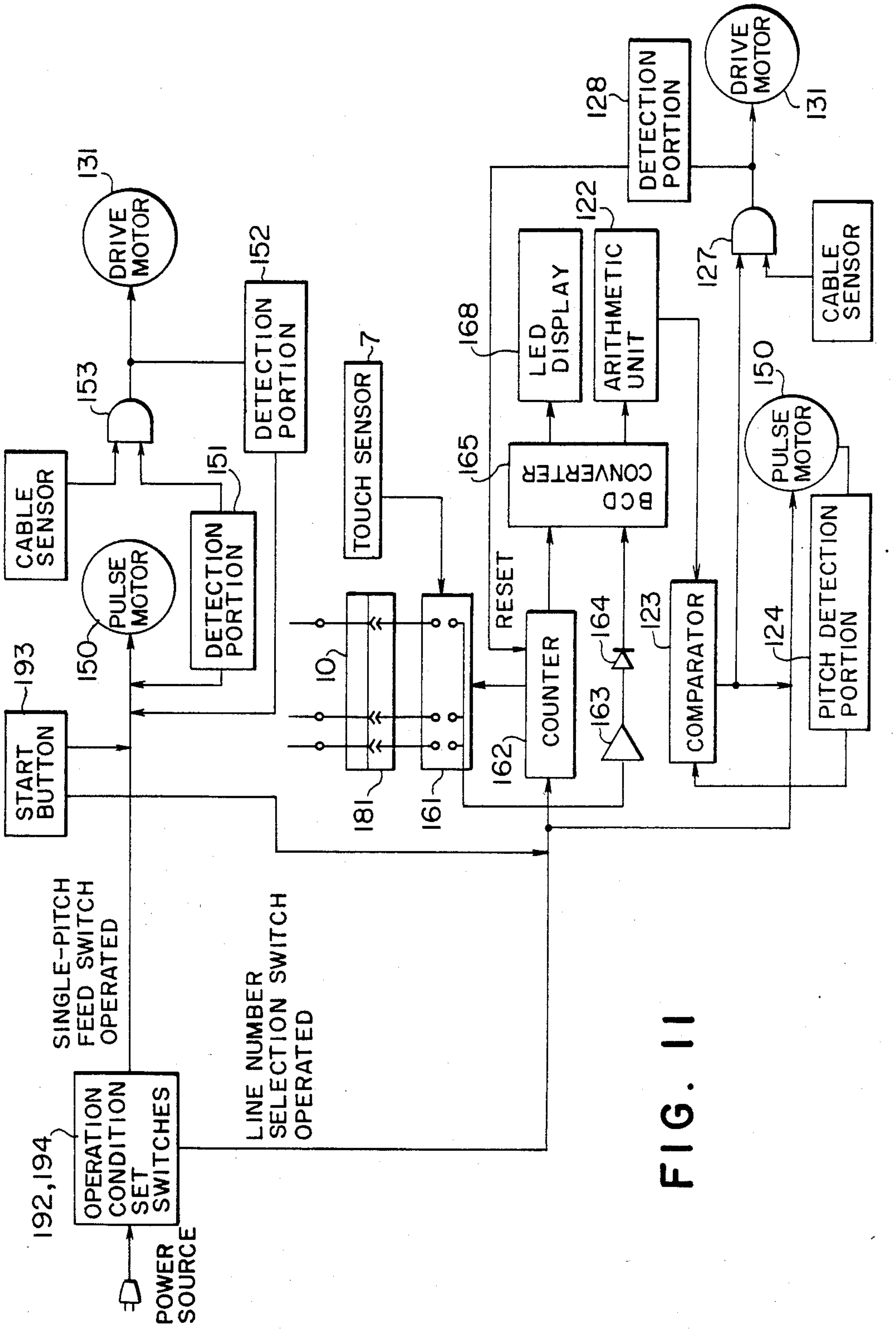
FIG. 11 is a block diagram showing a control circuit for the press-connecting apparatus of FIG. 3.

In FIG. 11, a single-pitch feed switch 192 is depressed among a plurality of operation condition setting switches, and the start button 193 is depressed. The pulse motor 150 then operates, and the connector 10 moves by one pitch. This motion is detected by a detection portion 151 which produces a signal to halt the operation of pulse motor 150. The signal from the detection circuit 151 is also applied to a gate circuit 153. When another input of the gate circuit 153 is served with a signal sent from a cable sensor that detects that the core 2 of cable 1 to be connected is inserted in the core guide groove 52 of the guide bar 135, the motor 131 is energized by the output of the gate circuit 153, and the core is press-connected. The core which is press-connected, is detected by a detection portion 152, and the pulse motor 150 is energized again to feed the connector by another pitch. Thus, the cores are successively press-connected to the contacts.

In FIG. 11, the connector 10 to which the cores are press-connected by the single-pitch feeding, is coupled to a coupling connector 181 (which corresponds to the coupling connector 5 of FIG. 2) of the detector connection box 180. Under this condition, the line number selection switch 194 is depressed among various operation condition setting switches, the start button 193 is depressed, and any one of the cores 2 at the other end of the cable is touched by the touch sensor 7. The electrostatic capacity of the touched core then changes from those of other cores. Therefore, the switch for the corresponding line number works in the scanner 161 of the detector, and the counter 162 scans with regard to which line number of switch has worked, and produces an electric signal. The electric signal is amplified through an amplifier 163, and is detected through a detector 164. Then, a BCD converter 165 sends to an LED display 168 a signal which indicates a contact number of the connector to which one end of the core touched by the sensor 7 has been connected. Namely, the line number of contact is displayed on the LED display 168. Therefore, the worker can know at a glance which line number was selected. The signal from the BCD converter 165 is also applied to an arithmetic unit 122 which calculates, based on the present contact position, the amount of pitches for moving the connector up to the position of a contact of a corresponding line number. As the start button 193 is depressed, on the other hand, the pulse motor 150 operates and the connector 10A moves. The amount of pitches for movement is detected by a pitch detection portion 124. The amount of pitches for movement produced by the arithmetic unit 122 and the amount of pitches by which the connector is moved, detected by the pitch detection portion 124, are compared by a comparator 123. When these amounts are in agreement, the comparator 123 produces an output to halt the operation of pulse motor 150, whereby movement of the connector 10A is stopped. The output of the comparator 123 is also supplied to one input of a gate circuit 127. As the other input of the gate circuit 127 is served with a signal sent from a cable sensor which detects that the end of the core 2 touched by the touch sensor 7 is inserted in the core guide groove 52 of guide bar 135, the gate circuit 127 produces an output to energize the motor 131, so that the core is press-connected. The core which is press-connected is detected by a detection portion 128, and the counter 162 is reset to make it ready for selecting the next line number. Thus, the cores are press-connected to the contacts which correspond to selected line numbers.

When the cross-wiring box 125 is not used as mentioned above, both ends of the individual cores of the cable 1 are press-connected to contacts of corresponding line numbers of the connectors 10 and 10A.

Next, mentioned below is the case when a so-called cross-wiring is effected using the press-connecting apparatus of FIG. 3.

Figure 12:
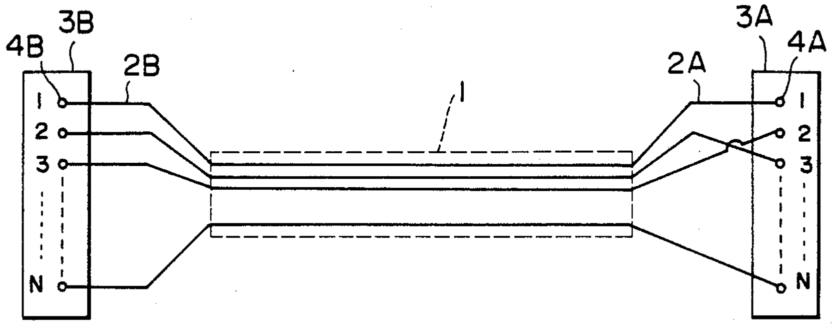
FIG. 12 is a diagram which schematically illustrates an example of cross-wiring.

When it is desired to modify a portion of the circuit without changing the fundamental pattern of electric circuit of an electric equipment, or when it is attempted to prepare a novel circuit utilizing the existing printed circuit board, a circuit of multicore cable which is a peripheral circuit and which is connected through connectors, is often changed. That is, the multicore cable and the connectors are connected in a crossing manner. An example of connection is explained below with reference to FIG. 12. Cores 2A, 2B at both ends of the multicore cable 1 are connected to contacts 4A, 4B of the connectors 3A, 3B. In this case, lines are connected to contacts having the same line numbers of the connectors 3A, 3B. As mentioned earlier, however, when the lines must be cross-connected, the line numbers 2 and 3 are connected in a crossing manner as in the connector 3A of FIG. 12.

When the cores are to be cross-wired using the press-connecting apparatus of FIG. 3, the connector 181 provided in the detector connection box 180 is connected to the detector 160 via the cross-wiring box 125.

Figure 13:
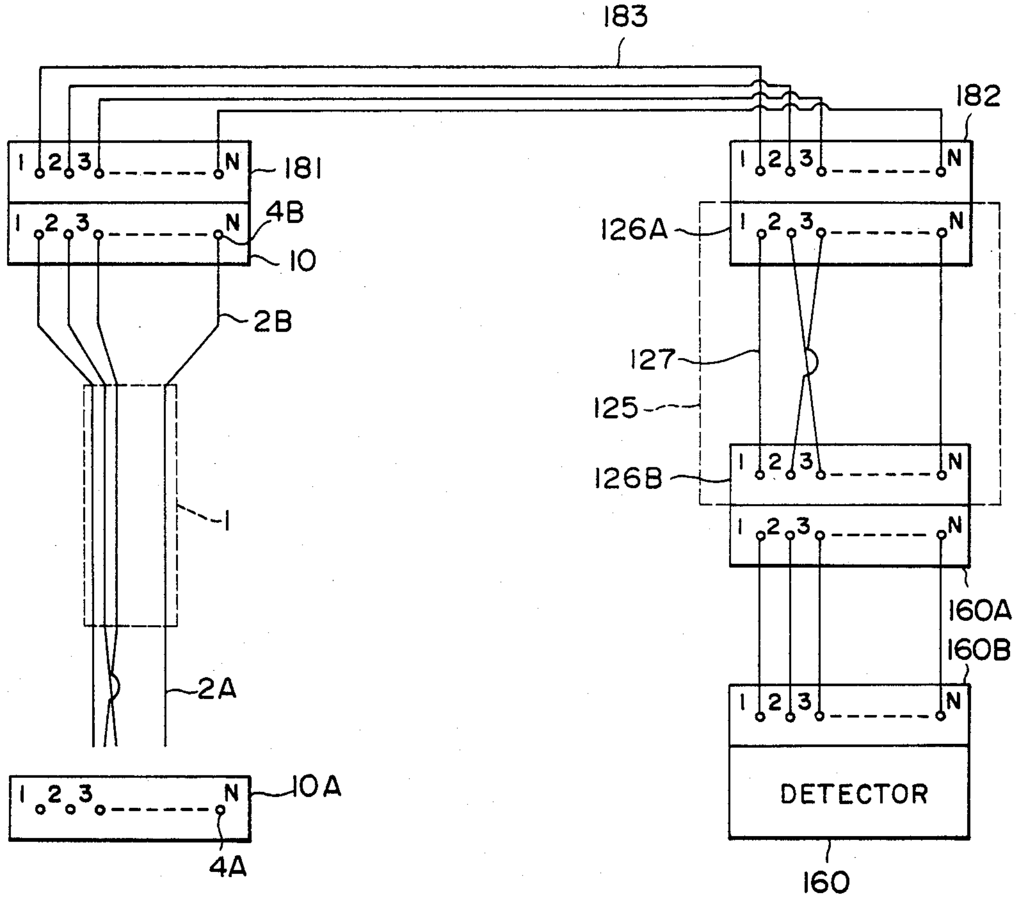
FIG. 13 is a diagram which schematically illustrates an example of cross-wiring in a cross-wiring box used in the press-connecting apparatus of FIG. 3.

When the cores are to be cross-wired as shown in FIG. 13, the cross-wiring box 125 is provided with a circuit in which the codes are cross-wired via electric lines 127 to contacts of required numbers of connectors 126A, 126B which have the same number of poles as the connectors 10, 10A to which the cores of multicore cable 1 are connected. In the example of FIG. 13, the line numbers 2 and 3 are cross-wired. To the connector 126A is coupled a connector 182 that is connected to the coupling connector 181 via electric lines 183, and to the connector 126B is coupled the connector 160A that is connected to the connector 160B of the detector 160.

Since cross-wiring has been accomplished in the cross-wiring box 126, cores between the two connectors can be cross-wired according to the same press-connecting sequence as the one mentioned earlier.

If lines of corresponding numbers are directly connected instead of crossing the wiring in the cross-wiring box 125, lines of the corresponding numbers can be connected between the two connectors by connecting the connector 181 of the detector connection box 180 to the detector 160 via the cross-wiring box 125.

The method and apparatus for press-connecting the cable of the present invention exhibits the following effects:

(1) The worker needs not discriminate by eyes the color markings of the cores or needs not read line numbers of the contacts. Therefore, the worker is less tired in the eyes.

(2) The worker needs simply grip any core and insert it in the core guide groove 52 of the guide bar 135. Therefore, the operation is very simple and can be done by anybody, without inviting erroneous connection and enabling the operation time to be greatly reduced. Further, by suitably changing the manner of cross-wiring in the cross-wiring box 125, any cross-wiring can be performed at all times according to the same procedure.

(3) A series of operations can be carried out within short periods of time, lending the method and apparatus for mass-production.

We claim:

1. An apparatus for press-connecting both the first and second ends of a multi-core cable to contacts of corresponding line numbers of respective first and second connectors, comprising:

an operation plate;

a press-connecting drive device provided on said operation plate for press-connecting the first and second end of cores of the multi-core cable to contacts of respective first and second connectors;

a connector holding/moving device provided on said operation plate for holding one of the first or second connectors and moving the held connector relative to a press-connecting position;

a detector for detecting the change of electrical conditions of a selected one of the cores;

a coupling connector for connecting said detector to the first connector which is connected to the cores at the first end of said multi-core cable; and a control circuit for controlling said connector holding/moving device and said press-connecting drive device, such that said press-connecting drive device is actuated after every single pitch movement of the first connector by said connector holding/moving device to perform a single-pitch feed press-connecting operation for successively press-connecting the first ends of the cores to the contacts of said first connector in a random fashion, and such that said press-connecting drive device is actuated after every movement of said second connector to select a corresponding line number on said second connector responsive to signals sent from said detector indicative of the line number or said first connector to which said selected core is connected, and second means for performing a line-selection feed press-connecting operation for successively press-connecting the second ends of each successively selected core to the line number contacts of said second connector corresponding to said line number contacts of said first connector of said selected core.

2. An apparatus for cross-wiring both the first and second ends of cores of a multi-color cable to contacts of line numbers of respective first and second connectors, comprising:

an operation plate;

a press-connecting drive device provided on said operation plate for connecting the first and second end of cores of the multi-core cable to contacts of the respective first and second connectors;

a connector holding/moving device provided on said operation plate for holding one of the first or second connectors and moving the held connector relative to a connecting position;

a detector for detecting the change of electrical conditions of selected one of the cores;

a coupling connector for connecting said detector to the first connector to which is connected to the cores at the first end of said multi-core cable;

a cross-wiring box disposed between said coupling connector and said detector for enabling any desired cross-wiring between the line number contacts in said first connector and the desired line number contact in said second connector; and a control circuit for controlling said connector holding/moving device and said press-connecting drive device, such that said press-connecting drive device is actuated after every movement of said second connector to select a corresponding line number responsive to signals sent from said detector indicative of the line number contact of said first connector is altered by said cross-wiring box and said second connector being held by said connector holding/moving device and being moved thereby to perform a line-selection feed press-connecting operation for successively connecting the second ends of the cores to the desired line number contacts of said second connector.

3. An apparatus for press-connecting first and second ends of a plurality of cores in a multi-core cable into corresponding line number contacts of first and second connectors respectively disposed at said first and second ends of said cores comprising:

an operation plate;

a press-connecting drive means for controllably press-connecting said first and second ends of said cores into respective corresponding line number contacts in said first and second connectors, said press-connecting drive means being mounted on said operation plate;

a moveable connector holder means mounted on said operation plate for holding in a first and a second instance said first and second connectors respectively and for controllably positioning the held first and second connectors relative to a press-connecting position in those instances;

a control circuit for controlling said press-connecting drive means and said moveable connector holder;

a detector detecting, in said second instance, the change of electrical condition of a selected one of said cores and for generating a signal indicative of the line number contact in said first connector previously connected in said first instance to said first end of the selected core, said detector being electrically coupled to said control circuit and being mounted on said operation plate;

a coupling connector for electrically coupling in said second instance said first connector and the connected first ends of each said core to said detector;

said control circuit providing in said first instance the single pitch movement of said moveable connector holder and said held first connector and actuating said press-connecting drive means to successively press-connect randomly selected individual ones of said first ends into said first connector and moving in said second instance said moveable connector holder to a position dependent upon said signal from said detector indicative of the line number contact in said first connector previously connected in said first instance to said first end of the selected core, said position being the corresponding line number contact in said second connector, and actuating in said second instance said press-connecting drive means to line-select feed and press-connect said second ends of the selected cores into line number contacts of said second connector corresponding to the line number contacts of said first connector.

* * * * *